United States Patent
Quere et al.

(10) Patent No.: US 9,054,959 B2
(45) Date of Patent: Jun. 9, 2015

(54) METHOD FOR INDICATING A SERVICE INTERRUPTION SOURCE

(75) Inventors: Thierry Quere, Montfort sur Meu (FR); Duncan Lamb, Rennes (FR); Jean-François Lagardere, Rennes (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1139 days.

(21) Appl. No.: 12/312,129

(22) PCT Filed: Oct. 30, 2007

(86) PCT No.: PCT/EP2007/061654
§ 371 (c)(1),
(2), (4) Date: Sep. 23, 2009

(87) PCT Pub. No.: WO2008/052982
PCT Pub. Date: May 8, 2008

(65) Prior Publication Data
US 2010/0036942 A1    Feb. 11, 2010

(30) Foreign Application Priority Data
Oct. 30, 2006    (FR) ..................... 06 54622

(51) Int. Cl.
*G06F 15/173*    (2006.01)
*H04L 12/24*    (2006.01)
(Continued)

(52) U.S. Cl.
CPC ........ *H04L 41/0677* (2013.01); *H04L 43/0811* (2013.01); *H04N 21/44209* (2013.01);
(Continued)

(58) Field of Classification Search
CPC .............................. H04L 67/28; H04L 15/16
USPC .................... 709/223, 224, 225; 725/11, 122; 370/252, 242
See application file for complete search history.

(56) References Cited

U.S. PATENT DOCUMENTS

| | | | |
|---|---|---|---|
| 6,588,016 B1 * | 7/2003 | Chen et al. ..................... | 725/111 |
| 7,660,297 B2 * | 2/2010 | Fisher et al. .................. | 370/352 |

(Continued)

FOREIGN PATENT DOCUMENTS

| | | |
|---|---|---|
| CN | 1421081 | 5/2003 |
| CN | 1735193 | 2/2006 |

(Continued)

OTHER PUBLICATIONS

"System and Signal Monitoring for IPTV Set-Top-Box Systems"—Karoly et al, NetVisor, May 2005 http://mazsola.iit.uni-miskolc.hu/DATA/events/2007/rceas/uploaded_files/85/17_f_70.pdf.*

(Continued)

*Primary Examiner* — Randy Scott
(74) *Attorney, Agent, or Firm* — Tutunjian & Bitetto, P.C.

(57) ABSTRACT

The present invention relates to a method used to indicate a service interruption source, in a client device of said service comprising an interface to a first network, said device being connected to a remote server by means of a gateway to which said device is connected by means of said first network; comprising the steps for starting up a downloading session from said remote server of a content, the end of the session requiring an acknowledgement from the user, detecting the connection loss between the device and the gateway, detecting the connection recovery between the device and the gateway, sending information (S6) to the server indicating the device disconnection period.

15 Claims, 4 Drawing Sheets

(51) Int. Cl.
*H04L 12/26* (2006.01)
*H04N 21/442* (2011.01)
*H04N 21/61* (2011.01)
*H04N 21/647* (2011.01)
*H04N 21/658* (2011.01)

(52) U.S. Cl.
CPC ..... *H04N21/44227* (2013.01); *H04N 21/6125* (2013.01); *H04N 21/6175* (2013.01); *H04N 21/6473* (2013.01); *H04N 21/6582* (2013.01); *H04L 41/0213* (2013.01); *H04L 41/0654* (2013.01)

(56) References Cited

U.S. PATENT DOCUMENTS

| | | | | |
|---|---|---|---|---|
| 7,860,114 | B1* | 12/2010 | Gallant et al. | 370/401 |
| 7,925,771 | B1* | 4/2011 | Ping et al. | 709/231 |
| 2001/0029529 | A1* | 10/2001 | Tachibana et al. | 709/220 |
| 2001/0033583 | A1* | 10/2001 | Rabenko et al. | 370/503 |
| 2003/0212803 | A1* | 11/2003 | Wu et al. | 709/228 |
| 2004/0019691 | A1* | 1/2004 | Daymond et al. | 709/231 |
| 2005/0039025 | A1 | 2/2005 | Main et al. | |
| 2005/0114879 | A1 | 5/2005 | Kamieniecki | |
| 2005/0155069 | A1* | 7/2005 | LaJoie et al. | 725/80 |
| 2005/0157877 | A1 | 7/2005 | Chen et al. | |
| 2005/0262537 | A1* | 11/2005 | Baran et al. | 725/88 |
| 2006/0031905 | A1 | 2/2006 | Kwon | |

FOREIGN PATENT DOCUMENTS

| | | |
|---|---|---|
| GB | 2417172 | 2/2006 |
| JP | 8289279 | 11/1996 |
| JP | 10042267 | 2/1998 |
| JP | 2006092461 | 4/2006 |
| JP | 2006227725 | 8/2006 |
| JP | 2008522487 | 6/2008 |
| WO | WO0139444 | 5/2001 |
| WO | WO2005107260 | 11/2005 |
| WO | WO2006057606 | 6/2006 |

OTHER PUBLICATIONS

Search Report Dated Feb. 13, 2008.

* cited by examiner

METHOD FOR INDICATING A SERVICE INTERRUPTION SOURCE

This application claims the benefit, under 35 U.S.C. §365 of International Application PCT/EP2007/061654, filed Oct. 30, 2007, which was published in accordance with PCT Article 21(2) on May 8, 2008 in English and which claims the benefit of French patent application No. 0654622, filed Oct. 30, 2006.

This invention relates to a method for indicating a downloading service interruption source to a server.

The bit-rates authorized by the digital subscriber line noted as DSL, enable high bit-rate services to be implemented. Good quality video services can thus reach the subscriber. DSL can distribute the video broadcast service, known as broadcast mode. DSL can also, owing to the possibility of using a return channel from the subscriber to the content broadcaster, allow interactive services to be set up. Video-on-demand services, noted as VoD, are thus offered to the subscriber. This involves providing a panel of videos that the subscriber can download from a content server and view on demand. Depending on the services proposed, the subscriber can view the video as is it being downloaded, in streaming mode. In this case, the video is viewed once and is not stored in the memory. According to another type of service, the subscriber can download and store the video in memory to view it subsequently one or more times, or keep it. Generally, an acknowledgement by the subscriber occurs both at the start to start downloading and at the end of the download operation to validate the viewing of the video and subsequently lead to the payment of the service.

On the subscriber side, the video can be consulted on a computer screen. It can also be consulted on a television screen. This requires connecting the television set to a set-top box. Generally, the set-top box is connected to a modem that offers access to the VoD server via the Internet network. The set-top box can be connected to the modem by means of an Ethernet cable.

When an interruption in the VoD service occurs, the server implements a recovery on error mechanism. It uses commands of the Simple Network Management Protocol type, noted as SNMP, to restart the VoD session. This mechanism is enabled during a relatively short period that can be for example a maximum of two minutes. Beyond this period the error recovery mechanism stops; the delivery of the VoD has failed.

If during downloading the Ethernet cable is disconnected, this interrupts the VoD service. If the cable was unplugged for a sufficiently long time, there is no end of session acknowledgement from the subscriber; consequently the operator cannot measure the content quantity that the subscriber could have viewed. In other words, the subscriber can view the greater part of a content and then disconnect the Ethernet cable early enough before the end of downloading to avoid paying.

This invention relates to a method used to indicate a downloading service interruption due to a network disconnection from a server.

For this purpose, the object of the invention is a method used to indicate a service interruption source, in a client device of said service comprising an interface to a first network, said device being connected to a remote server by means of a gateway to which said device is connected by means of said first network; comprising the steps for starting a content downloading session from said remote server, the end of the session requiring an acknowledgement from the user, detection of the loss of connection between the device and the gateway, detection of the connection recovery between the device and the gateway, and sending of information to the server indicating the device disconnection period.

Hence, by receiving this information, the server is informed when the VoD service interruption is due to a connection loss in the subscriber's local network. It receives details on the disconnection period, i.e. the beginning and the end.

According to a first variant, the information sending step occurs as soon as the device is reconnected.

The server, i.e. the service provider, also called the operator, immediately knows the service interruption cause.

According to a second variant, the information sending step occurs after a server request is received.

This makes it possible for the server to check the interruption cause ex post facto. Payment mechanisms may be started much later in the server, the mechanisms being de-correlated from the service distribution mechanism. This then requires an interruption cause check at that point.

In addition, the interruption information transmission may have been corrupted, and it is safer to keep a trace of the event in the set-top box memory.

According to particular invention embodiments, the first network is a point-to-point link, a wired or wireless local area network.

In particular, the session is a video on demand session.

In particular, the information is transmitted in a packet of the SNMP type.

The invention also applies to a computer program product comprising program code instructions for the execution of the steps of the method according to the invention, when this program is executed on a computer. "Computer program product" is understood to mean a computer program medium that can consist not only in a storage space containing the program, such as a diskette or cassette, but also a signal, such as an electrical or optical signal.

The invention will be better understood and illustrated by means of the following embodiments and implementations, by no means limiting, with reference to the figures attached in the appendix, in which.

Figure 1:
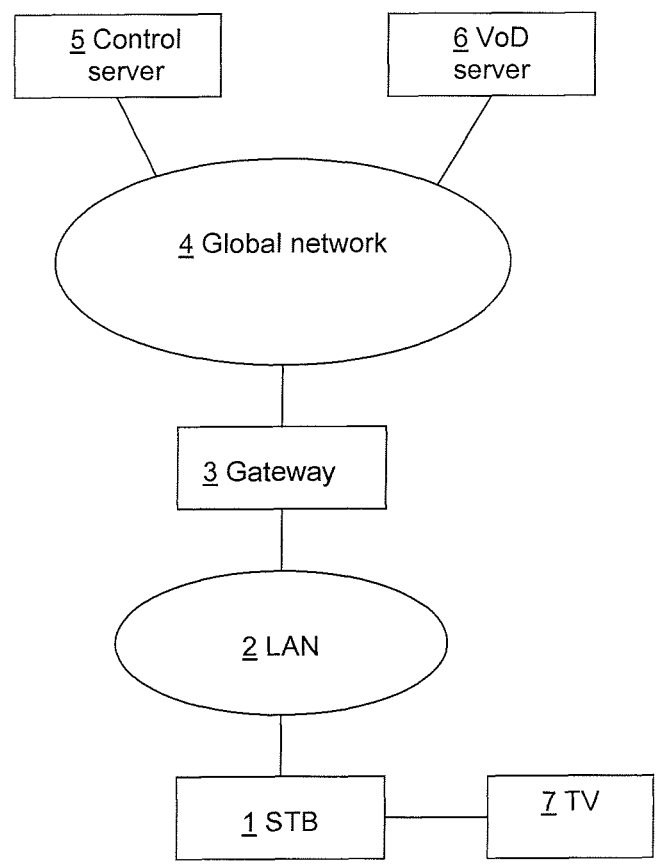
FIG. 1 shows the video-on-demand system according to the embodiment.
Figure 2:
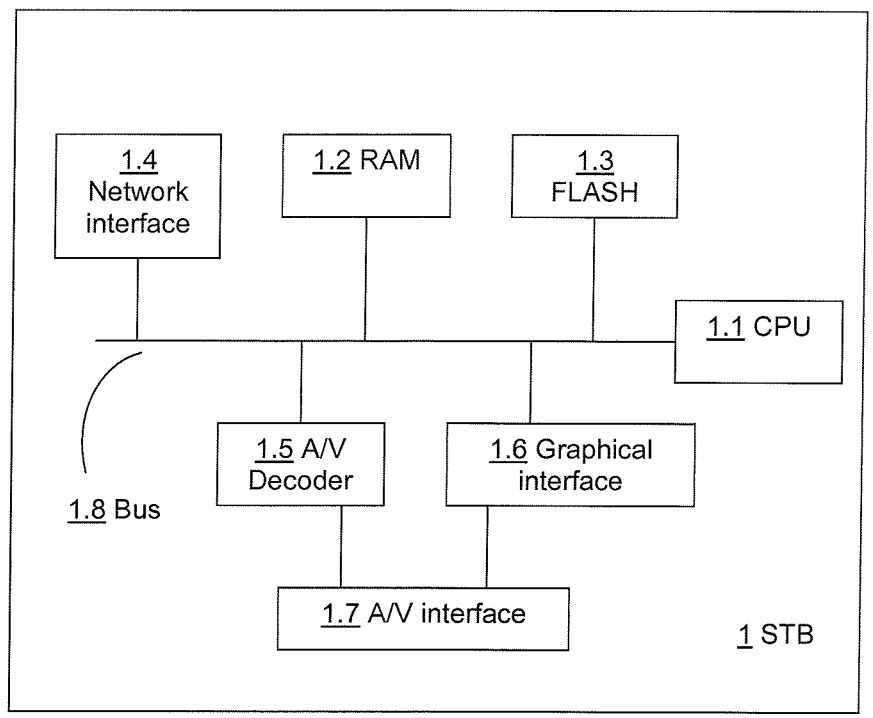
FIG. 2 shows the hardware architecture of the set-top-box.

In FIGS. 1 and 2, the modules shown are functional units that may or may not correspond to physically distinguishable units. For example, these modules or some of them can be grouped together in a single component, or constitute functions of the same software. On the contrary, some modules may be composed of separate physical entities.

The main elements of a system providing a VoD service are shown in FIG. 1. The set-top box 1, noted as STB in the rest of the document, is connected to a gateway 3 by means of a local area network 2. The local area network is an Ethernet network and can also be another type of wired network, or also a wireless LAN. The network can also limit itself to an Ethernet point-to-point link, as in the embodiment. STB 1 comprises an interface to a television screen 7.

Gateway 3 connects the local area network 2 to an Internet network 4 which is connected to the servers enabling the VoD service to be provided for the subscribers. Different client-server functions are required to set up the VoD service. They are functions such as Hyper Text Transfer Protocol noted as HTTP, Real Time Streaming Protocol noted as RTSP, Dynamic Host Configuration Protocol noted as DHCP, and Simple Network Management Protocol noted as SNMP. Two servers 5, 6 are shown in FIG. 1, an HTTP server 5 and an RTSP server 6, also called a VoD server. The servers can naturally be included in the same item of equipment or in separate items of equipment that can be located in separate parts of the network. Among other things, the HTTP server provides the user interfaces in the form of Hyper Text Markup Language pages, noted as HTML, for the client.

According to the embodiment, the gateway includes an ADSL modem which is used to connect the LAN to the Internet network by means of an ADSL connection. The gateway could just as well include another type of DSL modem, or modem used for any other broadband connection type.

The essential parts of the STB 1 that are well-known per se with regard to the VoD service are shown in FIG. 2. The STB comprises a network interface 1.4, which is an Ethernet type interface in the embodiment. It comprises a memory of the Random Access Memory type, noted as RAM 1.2 corresponding to the main memory, and a secondary memory of the Flash type 1.3, that can store data even when the device is no longer powered up. The STB also comprises a central processing unit 1.1 noted as CPU. The audio-video decoder 1.5 and the graphical user interface 1.6 prepare the content that is sent to a screen by means of the audio-video interface. The data travels between the different modules via an internal bus 1.8.

Figure 3:
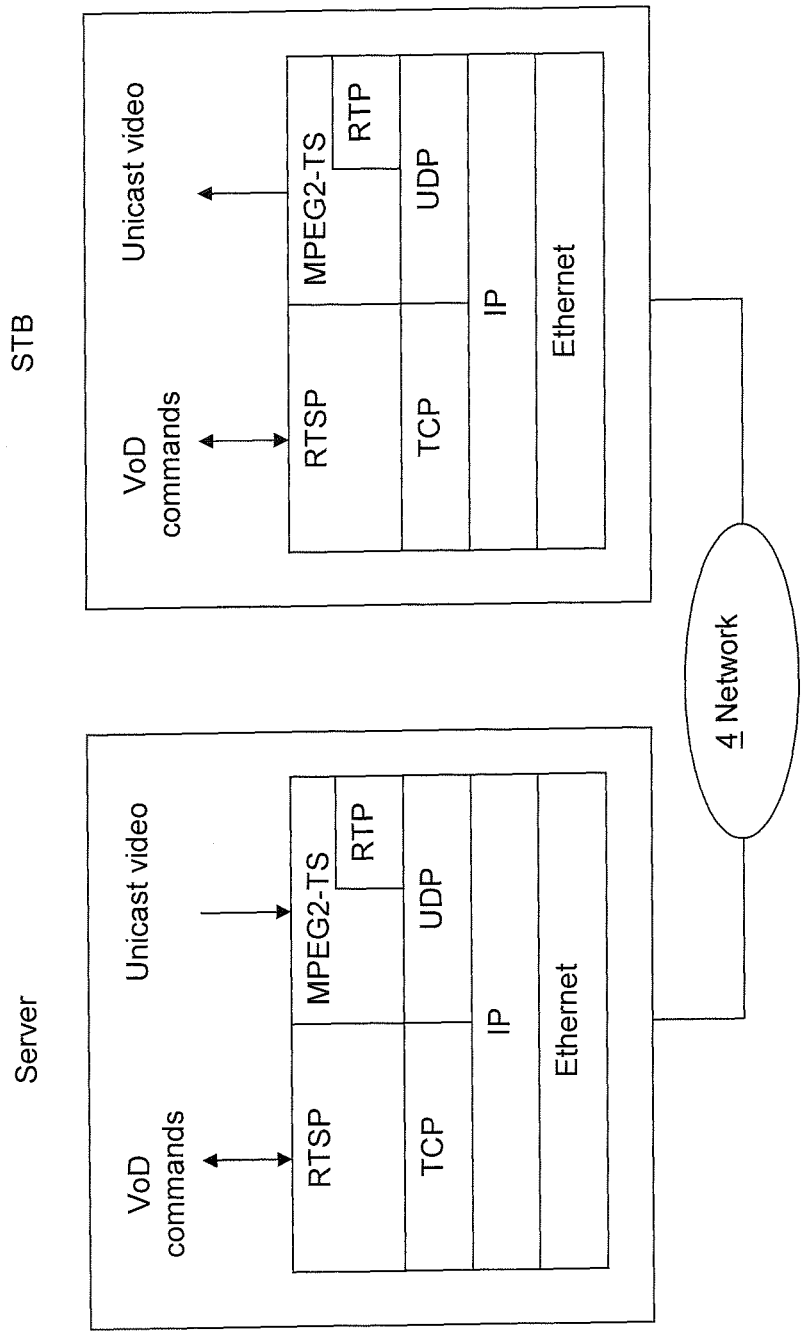
FIG. 3 shows the protocol layers used.

FIG. 3 shows the protocol layers used within the framework of the VoD service between the client STB and the server applications. In general, the VoD services are based on the set up of several signalling channels.

An HTTP type session processes the user commands. The HTTP server provides a user interface to the client in the form of pages in HTML format. The user interface offers the client various functions. This includes the choice of the film, acknowledgement of the ticket at the start of the session, the content display commands such as: Fast forward, Fast rewind, Pause, Play, ticket acknowledgement at the end of the VoD session. The viewing of the VoD is justified by the subscriber on the one hand with the acknowledgement of the entrance ticket for starting the VoD, and on the other with the acknowledgement of the exit ticket to confirm that the session has finished. The operator uses these acknowledgments to ensure that the VoD session has been correctly performed. It also allows the operator to proceed with the payment.

A session of the RTSP type or of the Real Time Protocol type, noted RTP, is used to control the VoD server according to user requests. RTSP can control the broadcast of the streaming flow.

A control protocol and remote notifications, based for example on the SNMP protocol can be used to control the VoD service. These are commands of the 'start VoD' type and notifications of the 'VoD started', 'VoD finished', 'VoD disturbed' service type, etc.

An access control mechanism is used to control the service access authorisations.

An IP connection implementing UDP is used to transport the useful data of the audio, video, subtitles type, etc.

Figure 4:
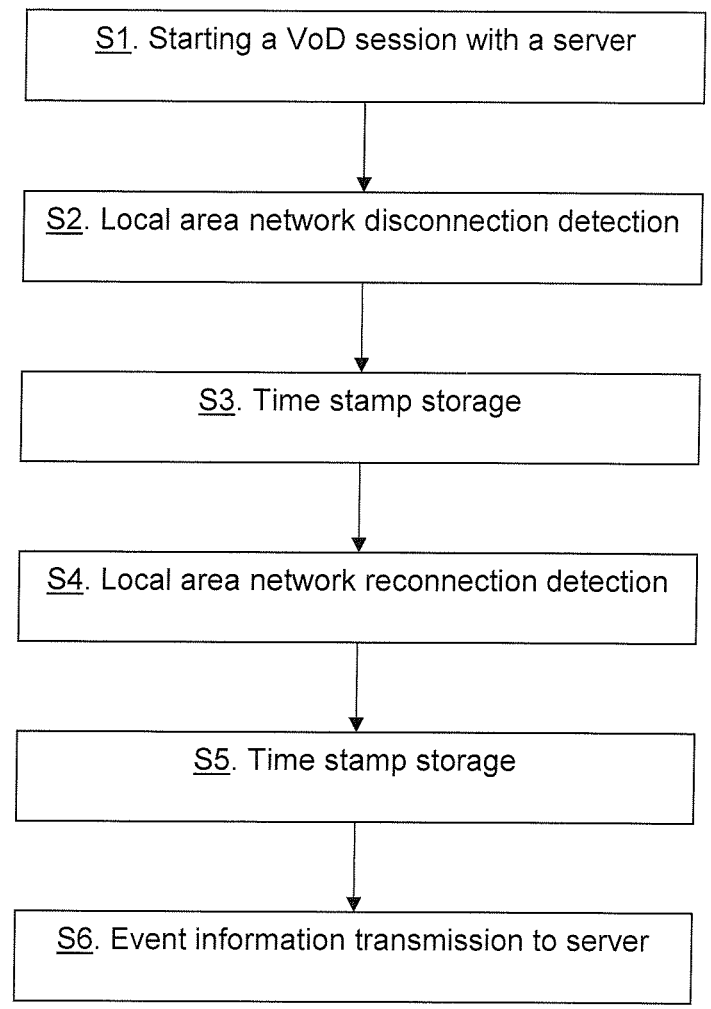
FIG. 4 shows the signalling method steps.

According to the embodiment, the STB implements the following procedure when the connection with the gateway is interrupted during a VoD session. This makes it possible for the operator to be warned of the disconnection during the session. The procedure is carried out by an application which is executed in the RAM 1.2 memory. In the case where the STB is directly connected with an Ethernet cable to the gateway, and as shown in FIG. 4, the procedure includes the following steps:

A VoD session starts in the streaming mode with a remote VoD server 6, step S1.

The connection with the gateway is interrupted: the Ethernet cable is disconnected either from the Ethernet 1.4 physical port of the STB or from the physical port of the gateway, step S2. In the first case, the STB detects the absence of connection to the Ethernet physical port; the Ethernet port having the means known per se to signal the connection or disconnection of a cable. In the second case, the STB detects the absence of the gateway; it detects the absence of connection at the Ethernet cable with means known per se. The disconnection detection occurs at the same time as the disconnection. The STB stores the time stamp, step S3, corresponding to the exact time when the cable was disconnected. The STB comprises time stamping means which are included in the CPU. The STB synchronizes itself by means of the Network Time Protocol synchronization protocol, noted as NTP, with a NTP server on startup and then every 4 minutes. This makes it possible to avoid any temporal drift, the CPU indeed includes a clock component which is not reliable with respect to time.

The STB also comprises means known per se to detect the reconnection of the Ethernet cable. When the Ethernet cable is reconnected to the Ethernet 1.4 port, step S4, the corresponding time stamp is also stored, step S5.

The information relating to the disconnection event is grouped together: it includes the disconnection time stamp and the reconnection time stamp, and of course the information relating to the subscriber's identification and to the corresponding VoD service. It is transmitted to a remote server during the reconnection to the server, step S6. A means of transmitting this information consists in using a packet of the SNMP TRAP type, also called SNMP notification. The SNMP TRAP is used to report an alert or any type of asynchronous event. It is suitable to transmit this type of information.

In the case where the STB is connected to the gateway by means of an Ethernet network, and no more simply in point-to-point mode, the STB disconnection from the gateway is also detected by the STB. If the Ethernet cable is disconnected from the STB port, the STB detects the absence of a cable connection to the Ethernet physical port. If the gateway is disconnected from the LAN, the STB detects the absence of the gateway with conventional means used to detect the device absence on an Ethernet network. In other words, the device detects the fact that the gateway can no longer be reached by means of the LAN.

In the case of a wireless local area network, the STB detects the gateway connection interruption; either the STB is no longer connected to the wireless network, or the gateway is no longer connected to the wireless network. In the first case, the STB detects the absence of connection to the network. In the second case, the STB detects the absence of the gateway on the network with conventional means used to detect the device absence on a wireless network.

The information relating to the event can be kept in the FLASH memory of the STB. This makes it possible to keep a trace of the event should it be necessary to retransmit this information to the operator later. This information can then be transmitted upon operator request, the request in particular being of the GET SNMP type.

This information is used by the VoD service operator to be informed of the cable disconnection event. So, the operator has a precise knowledge on the service quantity from which the user has benefited in spite of the service interruption.

The invention claimed is:

1. A method to indicate a service interruption source, in a client device of said service, said client device comprising an interface to a first network, said first network being a residential local area network, said client device being connected by said first network through a residential gateway to a second network, said second network being a wide area network comprising a remote server, said method comprising:

starting up a downloading service session of a content from said remote server, said content being played during the download, the end of the session requiring an acknowledgement from the client device, detecting a connection loss between said client device and said residential gateway, detecting a connection recovery between said client device and said residential gateway, and once said connection has been recovered, sending information to the remote server indicating the time of the connection loss between said client device and said residential gateway and the time of the connection recovery between said client device and said residential gateway.

2. The method according to claim 1, wherein the information sending step occurs as soon as the device is reconnected.

3. The method according to claim 1, wherein the information sending step occurs after a server request is received.

4. The method according to claim 1, wherein the first network is a point-to-point link.

5. The method according to claim 1, wherein the first network is a wired or wireless residential local area network.

6. The method according to claim 1, wherein the session is a video-on-demand session.

7. The method according to claim 1, wherein the information is transmitted in a packet of the SNMP type.

8. A non-transitory computer-readable storage medium comprising a computer program product with program code instructions for executing at a client device the steps of:

starting up a downloading service session of a content from a remote server comprised in a wide area network, said content being played during the download, the end of the session requiring an acknowledgement from said client device, detecting a connection loss between said client device and a residential gateway, wherein the residential gateway connects a residential local area network to said wide area network;

detecting a connection recovery between said client device and said residential gateway; and once said connection has been recovered, sending information to said remote server on the wide area network indicating the time of the connection loss between said client device and said residential gateway and the time of the connection recovery between said client device and said residential gateway.

9. A client device, comprising:

an interface configured to connect the client device to a remote server via a first network that is connected to a residential gateway, said first network being a residential local area network and said remote server being connected to said residential gateway through a second network, said second network being a wide area network;

a processor configured to start a downloading service session of a content from said remote server, said content being played during the download, the end of the session requiring an acknowledgement from said client device; the processor further being configured to detect a connection loss between said client device and the residential gateway, to detect a connection recovery between said client device and the residential gateway, and, once said connection has been recovered, to send information to the server indicating the time of the connection loss between said client device and said residential gateway and the time of the connection recovery between said client device and said residential gateway.

10. The client device according to claim 9, wherein the processor is configured to send information to the server as soon as the device is reconnected.

11. The client device according to claim 9, wherein the processor is configured to send information to the server after a server request is received.

12. The client device according to claim 9, wherein the first network is a point-to-point link.

13. The client device according to claim 9, wherein the first network is a wired or wireless local area network.

14. The client device according to claim 9, wherein the session is a video-on-demand session.

15. The client device according to claim 9, wherein the information is transmitted in a packet of the SNMP type.

\* \* \* \* \*